United States Patent [19]

Pempek

[11] Patent Number: 4,921,023

[45] Date of Patent: May 1, 1990

[54] ROUTER GUIDE ATTACHMENT

[76] Inventor: George J. Pempek, 9740 S. 81st Ct., Palos Hills, Ill. 60465

[21] Appl. No.: 431,447

[22] Filed: Nov. 3, 1989

[51] Int. Cl.[5] ................................................ B27C 5/00
[52] U.S. Cl. .................................. 144/136 C; 33/42; 33/43; 144/134 D; 409/182
[58] Field of Search ........................... 33/41.1, 42, 43; 83/875; 144/134 D, 136 C; 409/182

[56] References Cited

U.S. PATENT DOCUMENTS

| | | | |
|---|---|---|---|
| 964,785 | 7/1910 | Johnson | 33/43 |
| 3,292,494 | 12/1966 | Anderson et al. | 409/182 |
| 4,483,071 | 11/1984 | te Kolsté | 33/42 |
| 4,685,496 | 8/1987 | Livick | 409/182 |
| 4,776,374 | 10/1988 | Charlebois | 144/136 C |
| 4,843,728 | 7/1989 | Francis | 33/42 |

*Primary Examiner*—W. Donald Bray
*Attorney, Agent, or Firm*—Lockwood, Alex, Fitzgibbon & Cummings

[57] ABSTRACT

An attachment mountable on the underside of a router by means of which slots or grooves may be accurately cut in a work-piece parallel to an edge of the piece. The attachment comprises a plate member preferably formed of transparent plastic sheet material. The plate member is generally sector-shaped and has an area several times greater than the area of the router underside. A router blade opening is located in the plate member. A fence member is pivotally attached adjacent one end to the plate member on the underside of the plate member adjacent its narrow end. The fence member has a straight edge which extends from the place of pivotal attachment to the arcuate edge of said plate member. The fence member has a cut-out in its straight edge of such size and location as to coincide with the router blade opening when the fence is aligned with the blade opening. The plate member has indicia adjacent its arcuate margin which indicate the perpendicular distance between the straight edge and the center of the router opening. Clamp means secure the fence member in selected set positions with respect to the plate member.

6 Claims, 3 Drawing Sheets

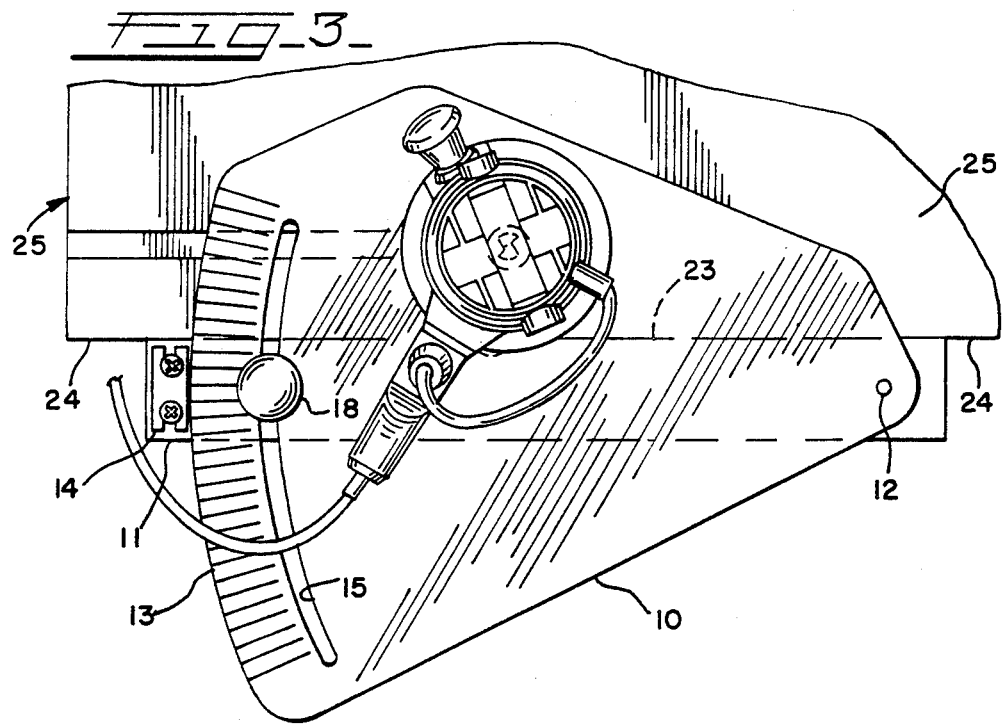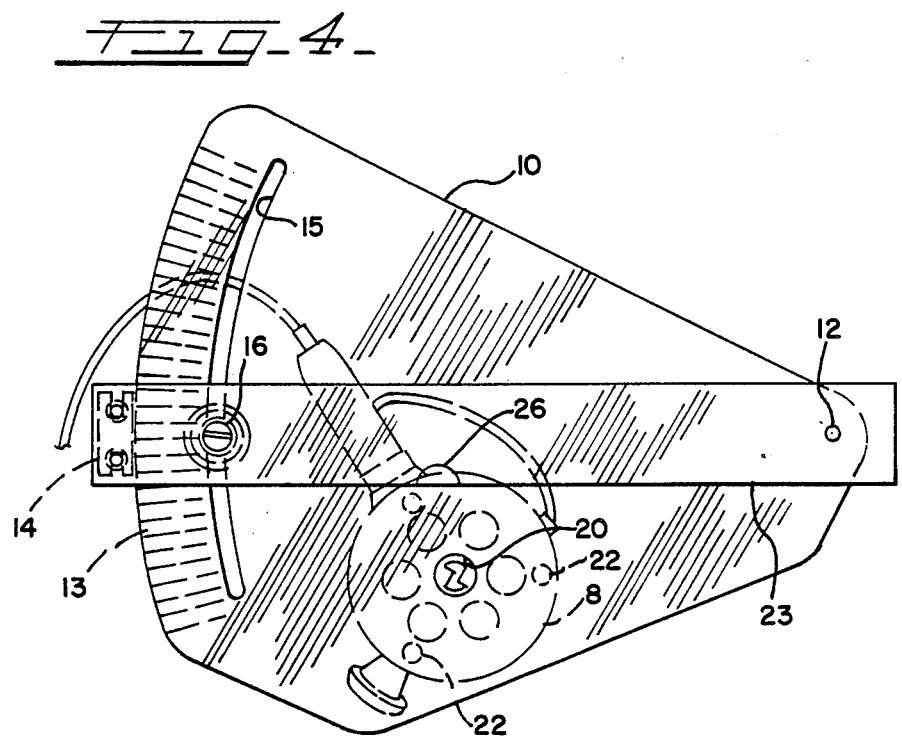

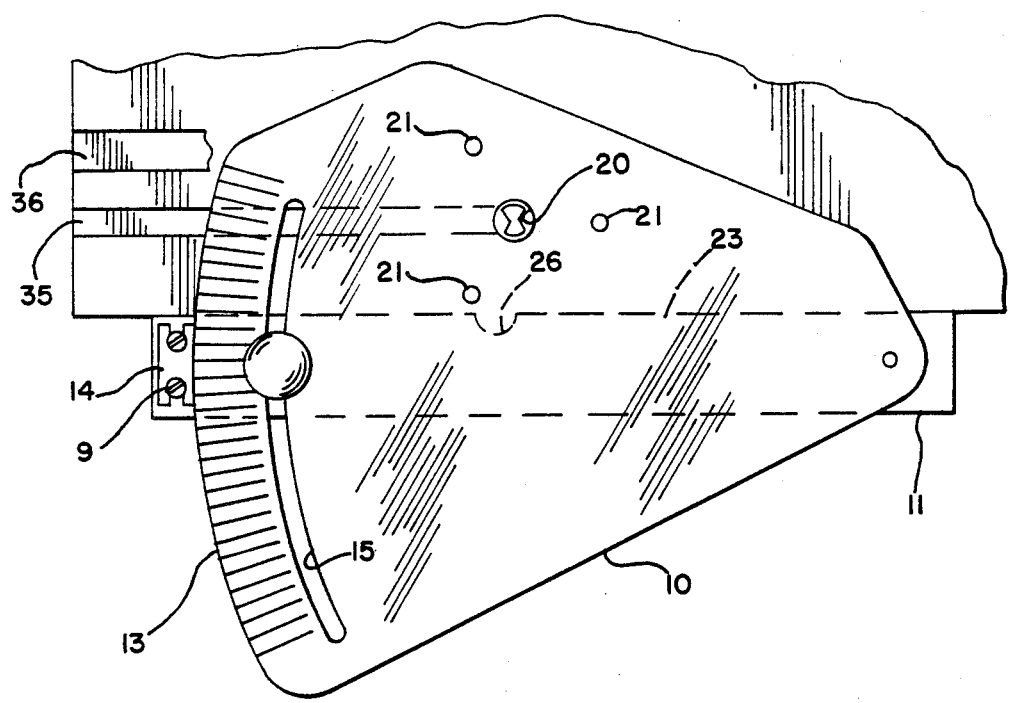

# ROUTER GUIDE ATTACHMENT

FIELD OF THE INVENTION

The present invention relates to innovations and improvements in guide attachments for manual routers whereby parallel grooves which are completely straight from end to end may be accurately located and cut in a piece of work material.

BACKGROUND OF THE INVENTION

In cabinet making and other carpentry work, there is a frequent requirement to use a router to cut grooves or slots which are parallel to an edge of a work piece including a rabbet groove in the edge itself. It is highly desirable that such grooves be located and cut with precision in order to facilitate subsequent assembly operations utilizing the work piece. Heretofore, considerable time has usually been required on the part of the workman to obtain such precision-cut and positioned grooves. Further, there has been difficulty in having the grooves completely straight at opposite ends. Still further, it has usually been necessary to interchange bits when going from cutting a narrow groove to cutting a wider groove.

U.S. Pat. No. 3,478,788 granted to H. J. Zelik on Nov. 18, 1969 discloses a router attachment of a general type that has been used to enable workmen to cut grooves in a workpiece which are parallel to a straight edge on the workpiece. However, attachments of this prior art type require considerable time and skill on the part of the workman in order to set a guide so that a groove is cut in the proper location. Usually, some trial-and-error manipulations are involved in the setting. Further, when using attachments of the type disclosed in the Zelik patent considerable difficulty is involved in forming grooves which are completely straight at opposite ends. Other patents disclosing router attachments for the same general purpose include: U.S. Pat. No. 4,044,805 to D. D. Gronholz dated Aug. 30, 1977; U.S. Pat. No. 4,685,496 to L. R. Livick dated Aug. 11, 1987; U.S. Pat. No. 4,718,468 to G. W. Cowman dated Jan. 12, 1988 and U.S. Pat. No. 4,776,374 to B. Charlebois dated Oct. 11, 1988.

SUMMARY OF THE INVENTION

The router attachment of the present invention is readily attached to a router and easy to use. It is light in weight, durable and relatively inexpensive being formed preferably of transparent plastic sheet stock. The attachment comprises two main parts one being a plate member which is attached to the underside of the router and the other being a fence member which is pivotally attached to the plate member. In addition, it will usually be desirable to provide clamp means so as to secure the fence member in various selected positions into which it is pivoted relative to the plate member. The plate member is preferably generally sector shaped with an area several times greater than the area occupied by the underside of the router where it is attached to the plate member. The fence member is pivotally attached to the plate member adjacent to the narrow end of the plate member and extends to adjacent or beyond the arcuate margin of the plate member. The arcuate margin is provided with indicia markings by means of which the straight edge on the fence member can be conveniently positioned with precision a desired distance from the center of the router blade and the center of the opening in the plate member through which the router blade extends. The straight edge on the fence member has a cut-out therein which overlies the router opening when the fence is aligned with the opening as it is in cutting rabbet grooves in the edge of a workpiece.

The object of the invention, generally stated, is the provision of a router guide attachment by means of which either skilled or unskilled workmen can with precision cut grooves in a piece of work material parallel to straight edge thereon and which attachments are economical, light weight and durable.

For a more complete understanding of the nature and scope of the invention reference may now be had to the following detailed description of a preferred embodiment of the invention taken in connection with the accompanying drawings wherein:

BRIEF DESCRIPTION OF THE DRAWINGS

FIG. 3 is a top-plan view of the set-up shown in FIG. 1;

FIG. 4 is a bottom-plan view of the set-up shown in FIG. 1.; and

FIG. 5 is a plan view corresponding to FIG. 3 with the router removed from the guide attachment and showing a partially formed wider slot cut in the workpiece parallel to a narrower slot.

Figure 1:
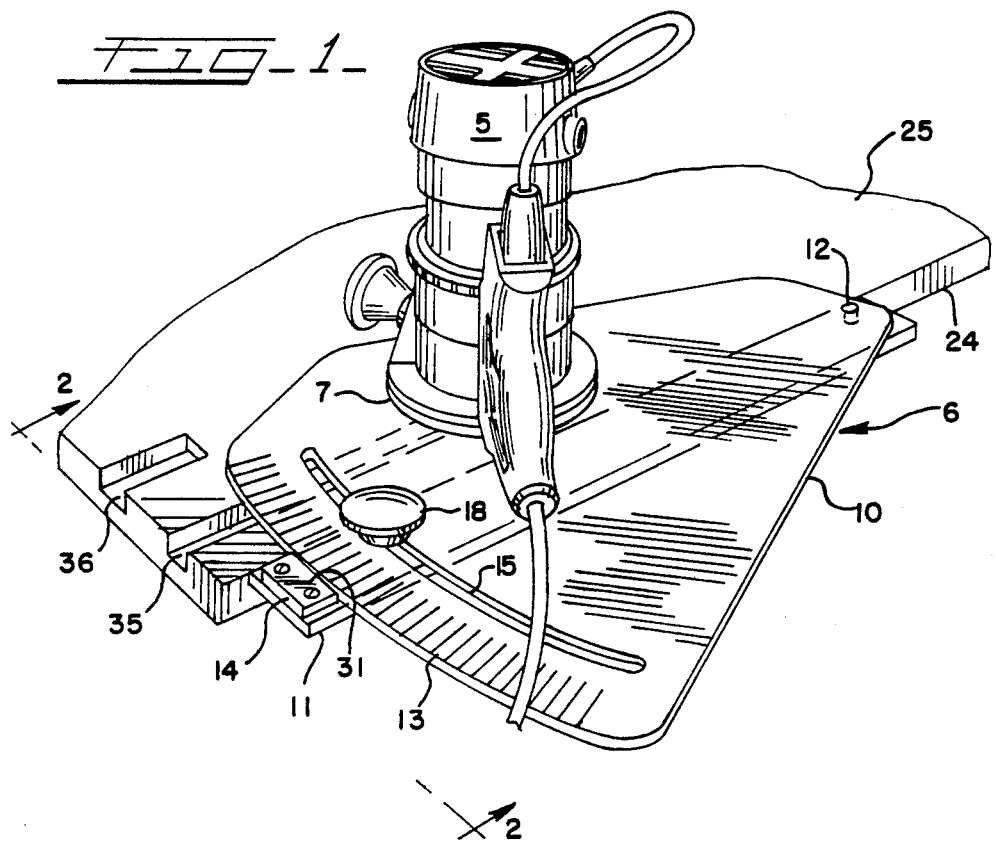
FIG. 1 is a perspective view showing a guide attachment of the present invention attached to the underside of a router and in the process of cutting a groove in a workpiece.

Referring to the drawings, a conventional, commercially available router, indicated generally at 5, is shown mounted on an attachment forming an embodiment of the present invention which is indicated generally at 6. The router 5 may for example be a Model 6911-6912 manufactured by PORTER-CABLE. The router 5 has a circular base 7 from the center of which a router blade 8 extends downwardly. The router blade 8 is secured or clamped in known manner so as to be interchangeable with blades of different sizes and so as to extend the desired distance below the base 7. It will be understood that the router 5 and the router blade 8 and its method of mounting form no part of the present invention by themselves.

The attachment 6 comprises a generally sectored shaped plate member 10 which is preferably formed of rigid transparent plastic sheet material such as polystyrene, plexiglass, etc. A fence member 11 is pivotally secured adjacent one end thereof to the narrow end of the plate member 10 by suitable fastener means such as by a screw 12. The head of the screw 12 is preferably recessed in the fence 11 and preferably has a cylindrical portion adjacent to head which extends through a cylindrical opening in the fence with the threaded upper end of the screw screwed into the underside of the plate member 10. This means of pivotal attachment allows the fence 11 to pivot smoothly and without lost motion between the parts.

The end of the fence 11 opposite its pivoted end extends somewhat beyond the arcuate margin 13 of the plate member 10 and has a rectangular block 14 secured by screws 9 on top of the projecting end.

Figure 2:
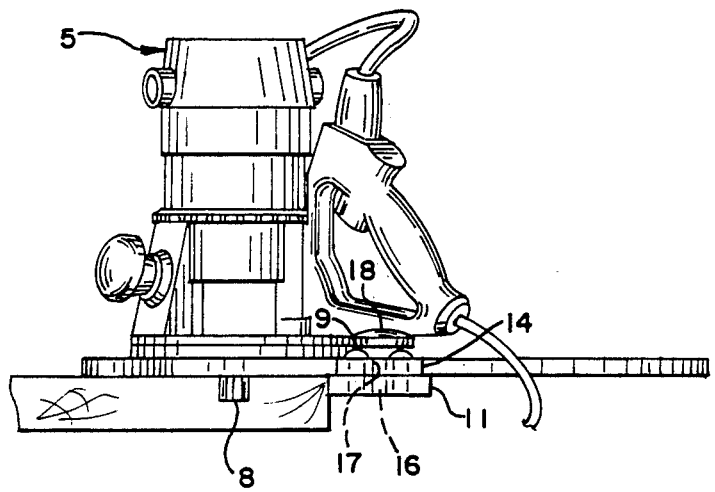
FIG. 2 is an elevational view taken on line to FIG. 1.

The plate member 10 is provided with an arcuate slot 15 adjacent its margin 13 which is concentric with the point of pivot attachment of the fence 11 by the screw 12. A screw 16 (FIGS. 2 and 4) extends upwardly through the fence member 15 so that its threaded shank portion 17 (FIG. 2) extends upwardly through the slot 15 so as to receive on its upper end a nut embedded in the underside of a knurled knob 18. It will be appreciated that when the knob 18 is loosened, the fence member 11 can be swung from one end of the slot 15 to the other, as desired. By tightening the knob 18, the fence 11 will be drawn up against the underside of the plate member 10 and thereby secured in any selected pivoted position desired.

Adjacent one side, the plate member 10 is provided with a router receiving opening 20 (FIGS. 4 and 5) which is large enough to accommodate the maximum diameter router blade 8 used with the router 5. In addition, the plate member 10 is provided with three screw holes 21-21 which accommodate three screws 22-22 (FIG. 4) used to attach the plate member 10 the of the base 7 of the router 5. It will be understood that the circular base 7 has three internally threaded holes for receiving the upper ends of the screws 22.

It will be observed from FIG. 4 that the area of the underside of the router 5 which engages the top surface of the plate member 10 is relatively small in comparison with the overall area of the plate member 10, the latter being over five times the area of the underside of the router. This relationship, and particularly the length of the plate member 10 as measured from its narrow end to its arcuate margin 13 allows it to accommodate a fence member 11 which has a length several times (e.g. four) the diameter of the circular base 7 of the router 5. This permits the fence member 11 to have a straight edge 23 which is also several times greater in length than the diameter of the circular base of the router 5. The arcuate width of the plate member 10 allows the slot 15 to have a substantial arcuate length so that the attachment 6 can be used in the cutting of grooves a substantial distance inwardly (e.g. 6 inches) from the edge 24 of a workpiece indicated generally at 25.

The elongated straight edge 23 on the fence member 11 is provided intermediate its opposite ends with a half-moon cut-out 26 (FIGS. 4 and 5) which preferably has the same radius as the radius of the auger blade or bit receiving opening 20. The cut-out 26 is positioned so that when the fence 11 is swung to its maximum extent toward the router blade 8 permitted by the slot 15 the cut-out 26 will underlie the opening 20 and accommodate the desired portion of a router auger or blade 8 projecting through the opening 20.

The margin 13 of the plate member 10 is provided with indicia markings which serve as scale o graduation marks 30-30 which are alignable with a pointer line 31 (FIGS. 1 and 3) on the top of the block 14. Each of the indicium marks 30 when aligned with the line 31 corresponds to a predetermined perpendicular distance between the center of a router blade opening 20 and the straight edge 23 of the fence 11.

In use the clamp knob 18 is loosened sufficiently so that the fence 11 can be moved from side to side and the line 31 aligned with graduation mark 30 on the margin of the plate member 10 which corresponds to the desired distance of the centerline of the groove 35 to be cut in the workpiece 25 from the straightedge 24 thereof. The knob 18 is then tightened and the assembly attachment is placed on the workpiece so that the router blade 8 is ready to enter the edge of the workpiece and with the straight edge 23 of the fence resting against the edge 24. It will be seen that the portion of the straightedge 23 which extends between the router blade and the pivoted end of the fence is available to engage the edge 24. This length is sufficient to insure that the router blade enters the workpiece at precisely the desired location so that the beginning end of the groove 35 (FIGS. 1 and 5) will be as straight as the intermediate portion of the groove which is cut when the full length of the fence straight edge 23 slides along the edge 24. Likewise, at the end of the cutting of the groove 35 and emergence of the router blade 8, the length of the straightedge 23 between the router blade 8 and the distal end of the fence 11 will be available to ride against the edge 24 and insure that the terminal end of the groove 35 is also accurately cut and straight.

Having cut the groove 35 with a router blade 8 of desired size (e.g. one-half inch) another groove 36 can be cut which is wider using the attachment 6 and without changing the router blade. Thus, the fence 11 will be set so that pointer line 31 is opposite the distance desired for the centered line of wider groove 36 to be from the edge 24. This setting having been made, the fence 11 is then reset so that its straightedge 23 is one-half of the desired increase in width of the slot 36 on one side of the line 31. For example, if a one-half inch blade 8 has been used to cut groove 35 and it is desired to cut the groove 36 so as to have a width of three quarters of an inch, then the line 31 will be set one eighth of an inch to one side of where it would be set if groove 36 was to be a one half inch groove to be cut. The assembly 6 is then put in place on the workpiece and used to cut a groove that is five-eighth of an inch wide. When that groove has been cut, the assembly attachment is reset so that the line 31 is one eighth of an inch on the opposite side of where the center line for a one-half inch groove would be and another cut then made. The result is a three-quarter inch wide groove accurately made with a one-half inch blade.

It will be understood that a number of changes of a design nature may be made in the attachment 6 without departing from the nature and scope of the invention as defined in the following claims. Thus, the base member may be made of metal or wood and may have one or more open areas therein. Likewise the fence 11 may be formed of metal or plastic. The arcuate slot 15 can be omitted and the clamping knob 18 and screw 17 position on the outer end of the fence so that a portion of the underside of the knob will tighten against the margin 13 of the plate member 10.

What is claimed is:

1. A guide attachment adapted to be mounted on the underside of a router and comprising;
   a generally plate member having an area several times greater than that of the underside of the router, having a router blade opening therein closer located in the relatively small area of said plate member that coincides with the underside of said router and having scale indicia on or adjacent the margin of one edge;
   an elongated fence member having a straight edge on which there is a router blade accommodating cut-out intermediate its ends;
   fastener means pivotally attaching said fence member adjacent one end thereof to said plate member adjacent at a place remote from said one edge and with said straight edge facing said router blade opening; and
   clamp means mounted on said fence at or adjacent its distal end and engageable with said plate member for releasably securing said fence member in selected positions with respect to said plate member;

said cut-out in said straight edge being located and sized so that it at least partially coincides with said router blade opening when said fence member is aligned with said blade opening;

the distance between the location of said pivoted attachment of said fence member to said plate member and said scale being substantially greater than the longest dimension of said underside of said router; and said scale indicia corresponds to the perpendicular distances between said straight edge and the center of said blade opening in said plate member.

2. A guide attachment adapted to be mounted on the underside of a router and comprising;

a generally sector-shaped plate member having an area several times greater than that of the underside of the router, having a router blade opening therein closer to one side than the other located in the relatively small area of said plate member that coincides with the underside of said router and having scale indicia on or adjacent the margin of its arcuate edge;

an elongated fence member having a straight edge on which there is a router blade accommodating cut-out intermediate its ends;

fastener means pivotally attaching said fence member adjacent one end thereof to said plate member adjacent its narrow end and with said straight edge facing said router blade opening; and clamp means mounted on said fence at or adjacent its distal end and engageable with said plate member for releasably securing said fence member in selected positions with respect to said plate member;

said cut-out in said straight edge being located and sized so that it at least partially coincides with said router blade opening when said fence member is aligned with said blade opening;

the distance between the location of said pivoted attachment of said fence member to said plate member and said scale being substantially greater than the longest dimension of said underside of said router; and said scale indicia measures to the perpendicular distances between said straight edge and the center of said blade opening in said plate member.

3. The attachment called for in claim 2 wherein said plate member is formed of transparent sheet material.

4. The attachment called for in claim 2 wherein said fence has a reference line thereon which relates to said straight edge and which is alignable with said scale indicia.

5. The attachment called for in claim 2 wherein said plate member has an arcuate slot therein adjacent said scale indicia which is concentric with said location of pivoted attachment and a portion of said clamp mean projects through said slot.

6. The attachment called for in claim 5 wherein said clamp means comprises a screw mounted on said fence member and projecting upwardly through said arcuate slot and a knob tightenable downwardly against said plate member adjacent said slot.

* * * * *